United States Patent Office 2,854,379
Patented Sept. 30, 1958

2,854,379

TRANQUILIZING COMPOSITION COMPRISING 2-ETHYL-CIS-CROTONYLUREA

Otis E. Fancher, Elkhart, Ind., assignor to Miles Laboratories, Inc., Elkhart, Ind., a corporation of Indiana No Drawing. Application June 6, 1956
Serial No. 589,594

6 Claims. (Cl. 167—65)

This invention relates to a new article of manufacture and to methods of compounding and using the same. More particularly, the invention relates to the higher-melting isomer of 2-ethylcrotonylurea in dosage unit form having utility in the alleviation of nervous tension and anxiety in human beings. This application is a continuation-in-part of my application Serial No. 316,812, filed October 24, 1952, now abandoned.

As is well known, sedatives of the barbiturate class in common use today have certain detrimental properties making them inherently dangerous. In the first place, these compounds generally have a narrow range between effective and dangerous doses. In addition, their use is very commonly followed by a dull or depressed feeling, or "hangover," after their sedative effect has passed. Finally, it is now believed that sedatives of the barbiturate group are capable of producing some degree of addiction.

It is an object of the invention to provide a sedative composition which is not habit forming, which is effective to produce sedation over an extremely wide dosage range before a toxic dose is reached, and which is substantially free of the untoward side-effects which characterize many sedatives of the prior art. A further object is to provide a method of producing sedation in human beings through the internal administration of the compositions of the invention. The term sedation as used in the specification includes what is commonly referred to in the art as tranquilization.

A sedative, according to the invention, includes as an essential ingredient the higher-melting isomer of 2-ethylcrotonylurea (2-ethyl-cis-crotonylurea), which compound is preferably combined with appropriate pharmaceutical fillers, carriers, extenders, and/or excipients to render the composition particularly suitable for human use.

The isomers of 2-ethylcrotonylurea can be prepared by procedures indicated in the following equations.

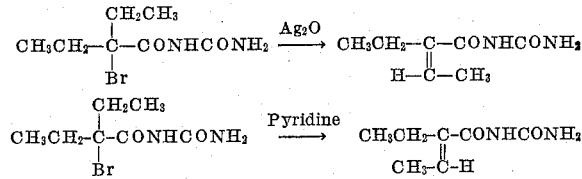

The 2-ethyl-cis-crotonylurea used in this invention is obtained in the reaction using silver oxide, and melts at 192–193° C. The isomer obtained in the reaction using pyridine is 2-ethyl-trans-crotonylurea, and melts at 157–158° C.

The 2-ethyl-cis-crotonylurea is best prepared according to the following method;

Fifty-four gm. of carbromal (2-bromo-2-ethylbutyrylurea) in 600 cc. of isopropanol was stirred and refluxed for three hours with 27.8 gm. of anhydrous silver oxide. The reaction mixture was filtered and the silver residue was extracted with 100 cc. of boiling isopropanol. The filtered and dried solids which separated weighed 22.5 gm. and melted at 189–190.5°. Concentration of the filtrate yielded an additional 3.3 gm. of product which melted at 160–170°. These two crops were separately obtained as white needles by crystallization from alcohol and exhibited slight solubility in water. The first crop gave 21.7 gm. of 2-ethyl-cis-crotonylurea with a melting point of 191–193° C., and the second crop gave 0.9 gm. with a melting point of 191–193° C. for a total yield of 42.4 gm. or 63 percent of the theoretical.

In accordance with the invention, the active ingredient 2-ethyl-cis-crotonylurea may be associated with a pharmaceutical carrier, diluent or the like which may be either a solid material or, when the composition is intended for oral administration in liquid form, a suspending liquid, such as glycerine. Thus, the compositions may take the form of tablets, powders, capsules, suspensions or other dosage forms which are particularly useful for oral ingestion. More specifically, the present compositions in the preferred solid form, may be prepared by mixing the 2-ethyl-cis-crotonylurea with solid diluents and/or tableting adjuvants such as cellulose powder, cornstarch, lactose, talc, stearic acid, magnesium stearate, gums, or, indeed, any tableting materials used in pharmaceutical practice which are not incompatible with the 2-ethyl-cis-crotonylurea.

An important characteristic of 2-ethyl-cis-crotonylurea is its low toxicity when compared with that of other sedatives, such as the barbiturates. This quality has been well demonstrated by an extensive series of tests on rats, which tests have shown 2-ethyl-cis-crotonylurea to have an $LD_{50}$[1] of 2500 mgm., as against 160 mgm. for phenobarbital, 55 mgm. for pentobarbital, and 50 mgm. for secobarbital.

A further remarkable, and quite unexpected, characteristic of 2-ethyl-cis-crotonylurea is the extremely wide oral dosage range within which sedation may be secured with absolute safety. Thus, it has been shown that with 2-ethyl-cis-crotonylurea, sedation in rats is secured over the entire range between about 1% and about 60% of the $LD_{50}$; at increased doses of 2-ethyl-cis-crotonylurea above 60% of the $LD_{50}$, the rats progress deeper into a sub-hypnotic state but do not reach the true hypnotic state until the dose reaches about 95% of the $LD_{50}$. By way of comparison, the barbiturates mentioned above have very narrow oral dosage ranges for producing sedation in rats, commencing variously from about 3% to about 10% of the $LD_{50}$, and extending to a point just short of 20% of the $LD_{50}$. In the case of phenobarbital, the true hypnotic state is reached with doses of about 45% of the $LD_{50}$, while with pentobarbital and secobarbital, true hypnosis is reached at about 30% of the $LD_{50}$. Similar effects have been shown in comparative tests of these sedatives on dogs. It is seen, then, that 2-ethyl-cis-crotonylurea is many times less toxic than many of the commonly used barbiturates, and that it produces sedation at smaller fractions of the toxic dose and offers a much larger dosage range than that offered by the barbiturates before more profound effects are encountered.

The outstanding sedative properties of 2 - ethyl-cis-crotonylurea described above, have been found applicable ---
[1] $LD_{50}$ refers to the dose which is lethal for 50% of the animals of the particular species tested.

to human beings in the alleviation of nervous tension and anxiety. Of particular importance is the fact that the undesirable side-effects, such as "hangover" or depression, which commonly result from the use of prior-art sedatives, are substantially avoided by the use of 2-ethyl-cis-crotonylurea.

As noted above, sedative compositions according to my invention may take any of a variety of forms, and various carriers, adjuvants, diluents, and filters, may be employed therein. The percentage of active ingredient in my compositions may be varied, although it is advisable that the proportion of active ingredient be such that the compositions provide a suitable human dose.

Although 2-ethyl-cis-crotonylurea is insoluble in water, it is readily absorbed by the body after oral administration. The effective clinical dose for adults ranges from one to six grains (two to four grains being effective in most cases) taken one to four times daily, or as conditions demand. For children, the dosage is correspondingly smaller, according to the age and weight of the child. In a preferred form of administration, tablets are prepared containing the drug in a quantity between one and six grains. In preparing such tablets the drug is preferably compounded with one or more of the aforementioned carriers, adjuvants, fillers, etc., and the tablets may be finally coated with sugar or other coating materials in accordance with common practice in the tablet manufacturing art. Of course, a larger tablet scored to permit its being broken into the aforementioned dosage units, or a number of smaller tablets adapted to be taken at the same time to constitute a dosage unit, are also satisfactory.

The following examples are illustrative of procedures which may be employed in the preparation of two forms of sedative compositions in accordance with the invention.

Example I

| | |
|---|---|
| 2-ethyl-cis-crotonylurea | 300 parts. |
| Cellulose powder | 25 parts. |
| Dicalcium phosphate | 66 parts. |
| Methyl cellulose | 10 parts dissolved in 150 parts of water. |
| Corn starch | 50 parts. |
| Magnesium stearate | 1 part. |

The 2-ethyl-cis-crotonylurea, cellulose powder and dicalcium phosphate are thoroughly mixed in the dry state, after which the methyl cellulose solution is intimately mixed with the mixture. The wet mixture is sifted through a #10 screen and thereafter dried in a warm air oven. The dried mixture is then sifted through a #14 screen, blended with the corn starch and magnesium stearate, and the final blended mixture pressed into scored or unscored tablets of the desired size. A tablet of this composition weighting 450 mgm. will contain 300 mgm. of 2-ethyl-cis-crotonylurea.

Example II

| | | |
|---|---|---|
| 2-ethyl-cis-crotonylurea | grams | 24 |
| Glycerine | do | 48 |
| Carboxymethylcellulose | do | 11 |
| Aluminum magnesium silicate | do | 13 |
| Sugar | do | 340 |
| Preservative (methyl parahydroxybenzoic acid) | grams | 0.5 |
| Preservative (butyl parahydroxybenzoic acid) | grams | 0.2 |
| Water | ml | 2000 |

The 2-ethyl-cis-crotonylurea and glycerine are milled together to form a paste. The carboxymethylcellulose and aluminum magnesium silicate are dissolved in part of the water, and the sugar is dissolved in the remainder of the water. The two syrups thus formed are then mixed with the 2-ethyl-cis-crotonylurea paste, the preservatives added, and the mixture stirred for one-half hour, after which it is homogenized. The suspension thus produced contains 60 mgm. (about 1 grain) of 2-ethyl-cis-crotonylurea per 5 ml. (1 teaspoonful).

I claim:

1. An article of manufacture comprising a quantity of from about one to six grains of 2-ethyl-cis-crotonylurea and a pharmaceutical carrier in dosage unit form.

2. An article of manufacture comprising a quantity ranging from about one to six grains of 2-ethyl-cis-crotonylurea in a pharmaceutical capsule.

3. A composition of matter comprising a quantity of from about one to six grains of 2-ethyl-cis-crotonylurea and an effective amount of a non-toxic pharmaceutical binding agent pressed together in a dosage unit form.

4. A medicinal agent for the alleviation of nervous tension and anxiety comprising about one to six grains of 2-ethyl-cis-crotonylurea in dosage unit form.

5. A capsule for alleviation of nervous tension and anxiety, said capsule containing a solid diluent with an amount of from about one to six grains of 2-ethyl-cis-crotonylurea.

6. The method of inducing transquilization in human beings comprising administering internally to a human being, in dosage unit form, between about one and about six grains of 2-ethyl-cis-crotonylurea.

References Cited in the file of this patent

UNITED STATES PATENTS 983,425   Callsen _____ Feb. 7, 1911

OTHER REFERENCES

Rosenmund et al.: "Chemisches Zentralblatt," 1912, pp. 1793–1794.

Newberry: "J. Chem. Soc." (London), vol. 127, 1925, pp. 295–307.

Rice. "J. A. P. A.," vol. 33, Sept. 1944, pp. 289–297 (p. 293 pert.).